United States Patent [19]

Brown

[11] Patent Number: 6,038,086
[45] Date of Patent: Mar. 14, 2000

[54] MAGNIFYING DEVICE FOR VIEWING TOES AND TOENAILS

[76] Inventor: Alman Brown, 1110 Canyon Rd., Silver Spring, Md. 20904

[21] Appl. No.: 09/116,875

[22] Filed: Jul. 16, 1998

Related U.S. Application Data

[60] Provisional application No. 60/052,647, Jul. 16, 1997.

[51] Int. Cl.[7] .................................................. G02B 27/02
[52] U.S. Cl. .............................................................. 359/802
[58] Field of Search .................................... 359/802, 804, 359/805, 808

[56] References Cited

U.S. PATENT DOCUMENTS

| | | | |
|---|---|---|---|
| D. 206,684 | 1/1967 | Bevilacqua | D16/132 |
| 672,179 | 4/1901 | Porter | 359/815 |
| 1,025,057 | 4/1912 | Hampson | 359/815 |
| 1,536,365 | 5/1925 | Wiseman | 63/1.12 |
| 1,584,519 | 5/1926 | Dritz | 359/815 |
| 2,100,239 | 11/1937 | Carlton | 359/815 |
| 3,774,993 | 11/1973 | Senee | 359/804 |
| 5,218,482 | 6/1993 | Cioffi | 359/802 |
| 5,396,904 | 3/1995 | Hartigan, Jr. | 128/849 |

*Primary Examiner*—Scott J. Sugarman
*Assistant Examiner*—Suzanne Letendre

[57] ABSTRACT

A magnifying device for viewing toes and toenails includes a longitudinally extending main body portion securable to the lower leg with straps. The body portion curves at its distal end to extend over the ankle and a portion of the top of the foot. A head portion which houses a magnifying lens is attached to the distal end of the body portion via an attachment mechanism and extends over the top portion of the foot. The attachment mechanism allows head portion to be translationally extended and retracted from the distal end of the body portion in a plane substantially parallel to the distal end of the body portion and in a direction substantially parallel with the longitudinal axis of the foot extending from the heel to the toe. The magnifying lens is shaped to allow all of the toes of one foot to be viewed through the lens simultaneously. Alternatively, the body portion of the magnifying device rests on the bottom of the foot and is attached to the foot via straps. A malleable support which houses the magnifying lens extends upward from the body portion and over the top of the foot, such that all of the toes on the foot can be viewed simultaneously through the lens.

19 Claims, 2 Drawing Sheets

MAGNIFYING DEVICE FOR VIEWING TOES AND TOENAILS

CROSS REFERENCE TO RELATED APPLICATIONS

This application claims priority from U.S. Provisional Patent Application Serial No. 60/052,647, entitled "Optical Instrument for Magnifying Toes or Toenails", filed Jul. 16, 1997. The disclosure of that provisional patent application is incorporated herein by reference in its entirety.

BACKGROUND OF THE INVENTION

1. Field of the Invention

The present invention relates to a magnifying device for simultaneously viewing all of the toes or toenails of one foot.

2. Description of the Related Art

Magnifying devices have been used in various applications to make small and difficult-to-see objects more readily visible so that such objects can be operated on or manipulated with precision and ease. More particularly, a variety of attachment and mounting mechanisms have been proposed for situating magnifying lenses in a specific position relative to the object to be viewed.

By way of example, a device for magnifying fingernails and toenails disclosed in U.S. Pat. No. 5,218,482, incorporated herein by reference in its entirety, includes a magnifying glass mounted on a rod-like connector which extends from a swivel means rotatably fixed to a plate secured to supporting means that can be wrapped around a hand or foot. The magnifying glass of this device is sized to allow the user to view a single nail at one time. The swivel means facilitates the arcuate or sweeping movement of the rod with respect to the support means, thereby permitting the single-nail magnifying glass to be moved from one nail to an adjacent nail by turning the swivel means. However, while the sweeping, single-nail magnifying glass of this device provides a compact design with a small lens, this device does not permit all of the fingernails on one hand or all of the toenails on one foot to be viewed simultaneously. It would be useful for an optical instrument to be designed so as to facilitate viewing of all of the toes or toenails of one foot simultaneously.

SUMMARY OF THE INVENTION

It is an object of the present invention to provide a magnifying device which allows all of the toes or toenails of one foot to be viewed simultaneously.

It is another object of the present invention to provide a magnifying device that allows adjustment of the position of the magnifying lens relative to the user's toes and toenails.

It is yet another object of the present invention to provide a magnifying device that is adjustable for different foot sizes.

It is a further object of the present invention to provide a magnifying device which allows both of the user's hands to be free while magnifying toes or toenails.

The aforesaid objects are achieved individually and in combination, and it is not intended that the present invention be construed as requiring two or more of the objects to be combined unless expressly required by the claims attached hereto.

According to the present invention, a magnifying device for viewing toes and toenails comprises a longitudinally extending main body portion which can be secured to the lower leg of the user with straps. The body portion curves at its distal end to extend over the ankle and a portion of the top of the foot. A head portion which houses a magnifying lens is attached to the distal end of the body portion via an attachment mechanism and extends over the top portion of the foot. The attachment mechanism allows the head portion to be translationally extended and retracted from the distal end of the body portion in a plane substantially parallel to the distal end of the body portion and in a direction substantially parallel to the longitudinal axis of the foot extending from the heel to the toe. The magnifying lens is shaped to allow all five of the toes on one foot to be viewed through the lens simultaneously.

The magnifying device of the present invention advantageously allows a user to have both hands free while viewing toes or toenails, making it easier to perform pedicures and the like. Further, the magnifying device of the present invention allows all of the toes or toenails of one foot to be viewed simultaneously through the magnifying lens; consequently, once the device is properly positioned, the device does not need to be adjusted or repositioned to view different toes or toenails. Moreover, the magnifying device can be adjusted either by repositioning the body portion or by changing the position of the head portion relative to the body portion by extending or retracting the head portion to adjust for different foot sizes. By attaching to the lower leg of the user, the magnifying device of the present invention provides a more stable mounting base than conventional magnifying devices.

According to another embodiment of the present invention, the body portion of the magnifying device rests on the bottom of the foot and is attached to the foot via straps. A malleable support member which houses the magnifying lens extends upward from the body portion and over the top of the foot, such that all of the toes on the foot can be viewing simultaneously through the lens.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

Figure 1:
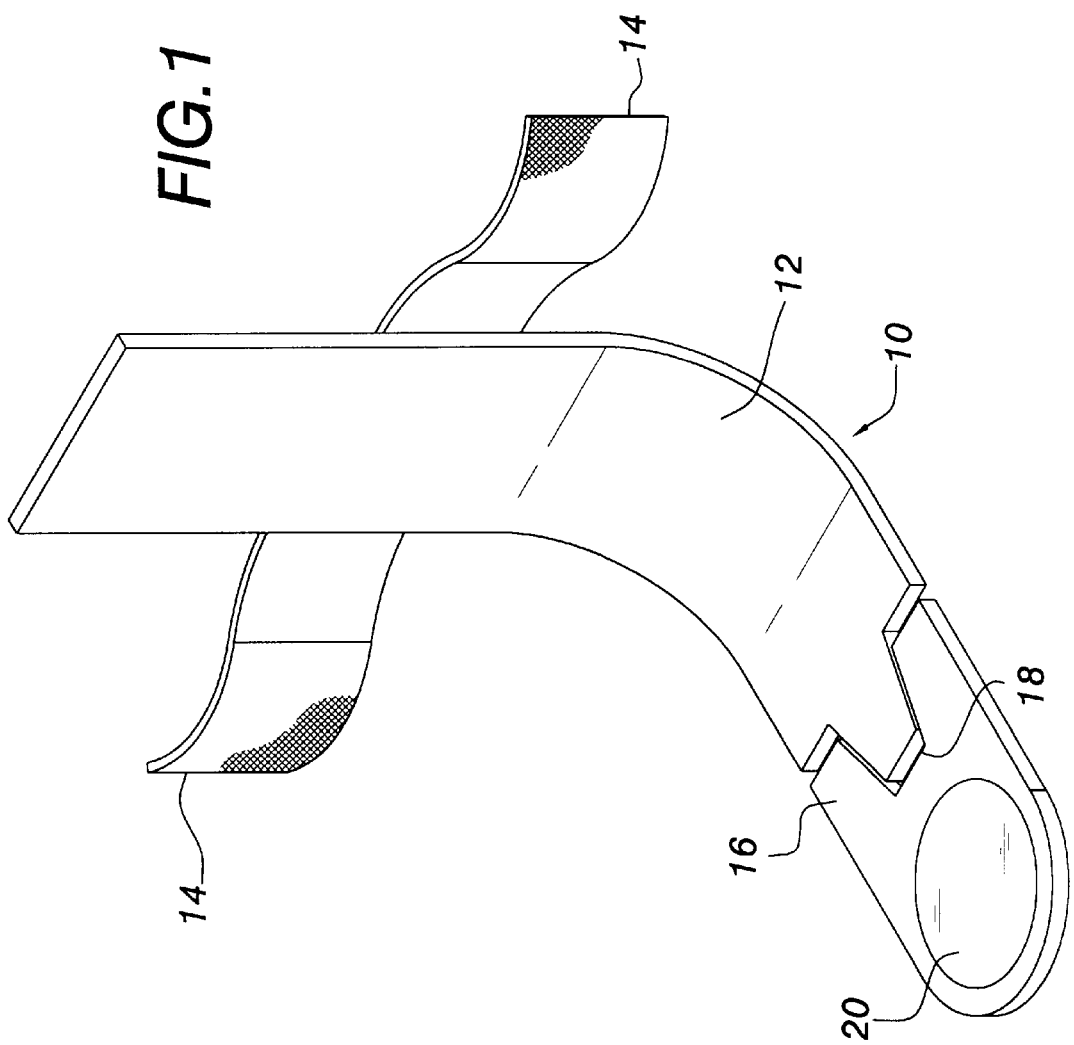
FIG. 1 is a perspective view of a magnifying device for simultaneously viewing all of the toes or toenails on one foot in accordance with a first embodiment of the present invention.

A magnifying device 10 for simultaneously viewing all five of the toes or toenails of one foot in accordance with a first exemplary embodiment of the present invention is illustrated in FIG. 1. Device 10 includes a longitudinally extending sheet-like body portion 12 shaped to extend along the length of the front of the lower leg of a user and, optionally, over a portion of the top surface of the user's foot. Preferably, body portion 12 does not extend above the user's knee when wore; however, the body portion of the present invention is not limited to any particular length and may extend over any portion of the user's leg. Body portion 12 can comprise a rigid material, such as a polymer or metal. Alternatively, body portion 12 can comprise a semi-rigid, malleable or deformable material which can be bent to conform to the contour of a particular user's leg and foot and which, once bent, tends to remain in the bent position.

Body portion 12 and can be curved to generally follow the circumferential contour of the user's leg and/or the longitudinal contour of the front of the user's leg and the top of the user's foot. More specifically, body portion 12 may be curved in the transverse direction to follow the circumferential contour of the lower leg. In the longitudinal direction, body portion 12 is generally straight over most of its length; however, at the distal longitudinal end (i.e., the end normally worn toward the foot), body portion 12 is preferably curved such that, when worn on the lower leg, the distal end of body portion 16 extends generally perpendicularly away from the leg near the ankle and extends over a portion of the foot, roughly parallel to the top surface of the foot.

Body portion 12 is secured to the lower portion of user's leg by fastening straps 14 which extend transversely from the longitudinal sides of body portion 12 and wrap around the circumference of the user's leg, for example, in the vicinity of the user's calf. Straps 14 include a fastening mechanism adapted to secure the straps to each other or to body portion 12. Alternatively, a single strap that wraps around the user's leg and that is securable to itself or to body portion 12 can be used. The fastening mechanism can be any conventional fastening mechanism, including, but not limited to, a hook and loop fastener, a buckle, a clasp or clipping mechanism, a snap, locking rings or frictional force. Preferably, strap or straps 14 are adjustable such that a body portion can be snugly attached to the user's leg.

Body portion 12 is connected at its distal longitudinal end to a head portion 16 via an attachment mechanism 18. Head portion 16 extends over the top of the foot along a plane substantially parallel with the distal end of body portion 12. Head portion 16 is generally flat, having a width substantially the same as that of the distal end of body portion 12 and a length sufficient to extend past the end of the user's toes when it is fully extended, as described below. More specifically, head portion 16 is preferably at least as wide as the typical user's foot. Toward the center of head portion 16 is a large hole formed therethrough in which is situated a magnifying lens 20 that is fixedly attached to the head portion 16, such that head portion 16 forms a peripheral housing around lens 20. Head portion 16 can comprise a rigid material such as a polymer or metal or a semi-rigid material suitable for securely housing lens 20.

Magnifying lens 20 can be made of glass, plastic or any other transparent material having light-magnifying properties. In accordance with the present invention, the hole formed through head portion 16 and magnifying lens 20 situated in the hole are of sufficient width and length to enable all five of the toes or toenails on one foot to be viewed simultaneously by the user through lens 20. Preferably, the hole and lens 20 are at least as wide as the widest expected foot, and can have any shape suitable for simultaneously viewing all of the user's toes and toenails from the user's vantage point, including, but not limited to, a generally circular, elliptical or rectangular shape.

Attachment mechanism 18 is designed to allow the position of head portion 16 to be adjusted relative to body portion 12 so that the position of magnifying lens 20 can be correspondingly adjusted relative to the user's toes to a desired viewing position. In accordance with the first embodiment, attachment mechanism 18 allows head portion 16 to move toward and away from the distal end of body portion 12 substantially in the plane of the distal end of body portion 12. In other words, when device 10 is attached to the lower leg, attachment mechanism 18 allows head portion 12 to move translationally in the longitudinal direction of the foot (i.e., in a direction substantially parallel to a line from heel to toe). In this manner, device 10 can be adjusted to accommodate feet of different sizes by extending or retracting head portion 16 so that magnifying lens 20 is properly positioned over the toes.

In the exemplary embodiment shown in FIG. 1, attachment mechanism 18 comprises a tab which extends longitudinally from the center of the distal edge of body portion 12 substantially in the plane of the distal end of body portion 12 (the distal "edge" is to be distinguished from the distal "end" in that the distal "end" connotes not only the actual "edge" but also the region near the edge). The distal edge of body portion 12 extends in the transverse direction on both sides of the center tab. The center tab terminates in a distal edge that is substantially parallel to the distal edge of body portion 12. Optionally, the center tab tapers (narrows) in width toward its distal end. The proximal edge of head portion 16 (i.e., the end adjacent body portion 12) also extends in the transverse direction and includes a center cut-out portion shaped to receive the center tab of body portion 12, i.e., the proximal edge of head portion 16 follows the contour formed by the distal edge of body portion 12 and the center tab. Thus, if the center tab is tapered, the cut-out portion of head portion 16 widens toward the proximal end of head portion 16.

The sides of the center tab are slidably coupled to the sides of the cut-out portion, such that the center tab can slide into and out of the cut-out portion while remaining engaged with the cut-out portion, thereby allowing head portion 16 to retract and extend from the distal end of body portion 12 along the plane of the distal end of body portion 12. By way of non-limiting example, the sides of the center tab and the cut-out portion may have mating slots and grooves or other mating protrusions and indentations which allow the center tab to slide while remaining engaged with the cut-out portion. Attachment mechanism 18 can maintain the relative positions of body portion 12 and head portion 16 by frictional force, so that force must be applied to slide the center tab and adjust the position of head portion 16. Optionally, the center tab and the cut-out portion can be couple via an indexing mechanism which allows head portion 16 to be extended from body portion 12 in one of several discrete positions. Of course, attachment mechanism 18 is not limited to the specific arrangement shown in FIG. 1, and other mechanisms that allow head portion 16 to extend and retract from the distal end of body portion 12 can be used.

As will be understood from the foregoing, there are two primary ways to adjust the position of the magnifying lens relative to the user's toes: the entire device 10 can be repositioned by adjusting the location at which straps 14 are secured to the user's leg; and the head portion 16 can be extended or retracted from the distal end of body portion 12 in the plane of the distal end of body portion 12 and generally along the longitudinal axis of the foot. These mechanisms allow device 10 to be adjusted to accommodate different foot sizes and to adjust the distance between the lens and the toes for optimal magnification and working space between lens 20 and the toes.

Where body portion 12 or head portion 16 is malleable, further adjustments can be made by deforming body portion 12 (or head portion 16) so that the position of magnifying lens 20 can be adjusted relative to the user's toes to a desired viewing position. As used herein the term "malleable" means having a capability to be bent or shaped by the application of force and having the capability or tendency to retain a position or shape without returning to an original (i.e., pre-bent or pre-shaped) position or shape in the absence of further force. For example, by bending body portion 12 or head portion 16, head portion 16 can be rotated, relative to body portion 12, about a transversely oriented axis of rotation, i.e., an axis that extends transversely across the foot, ankle or lower leg in a direction substantially perpendicular to the direction in which the toes extend and in a direction substantially parallel to the ground when the user's foot is on the ground. When head portion 16 is rotated about the transverse axis by bending, the angle between the plane of magnifying lens 20 and a plane substantially parallel to the surfaces of the toenails is adjusted. From another frame of reference, when the user's foot is on the ground, rotation of head portion 16 about the transverse axis causes the elevation angle of magnifying lens 20 to be adjusted, with the distal end of head portion 16 traveling toward and away from the knee. In this manner, the user can adjust the distance (and angle) between the toenails and magnifying lens 20 in order to achieve the desired level of magnification and room for examining or working on the toenails.

As will be understood from the foregoing, the magnifying device of the present invention advantageously allows the user to have both hands free while viewing toes or toenails, making it easier to perform pedicures and the like. Further, the magnifying device of the present invention allows all of the toes or toenails of one foot to be viewed simultaneously through the magnifying lens; consequently, once the device is properly positioned, the device does not need to be adjusted or repositioned to view different toes or toenails. Moreover, the magnifying device of the present invention can be adjusted either by repositioning the body portion or by changing the position of the head portion relative to the body portion and can be extended and retracted to adjust to different foot sizes. Because the magnifying device of the first embodiment attaches to the lower leg of the user, it provides a more stable mounting base than conventional magnifying devices.

Figure 2:
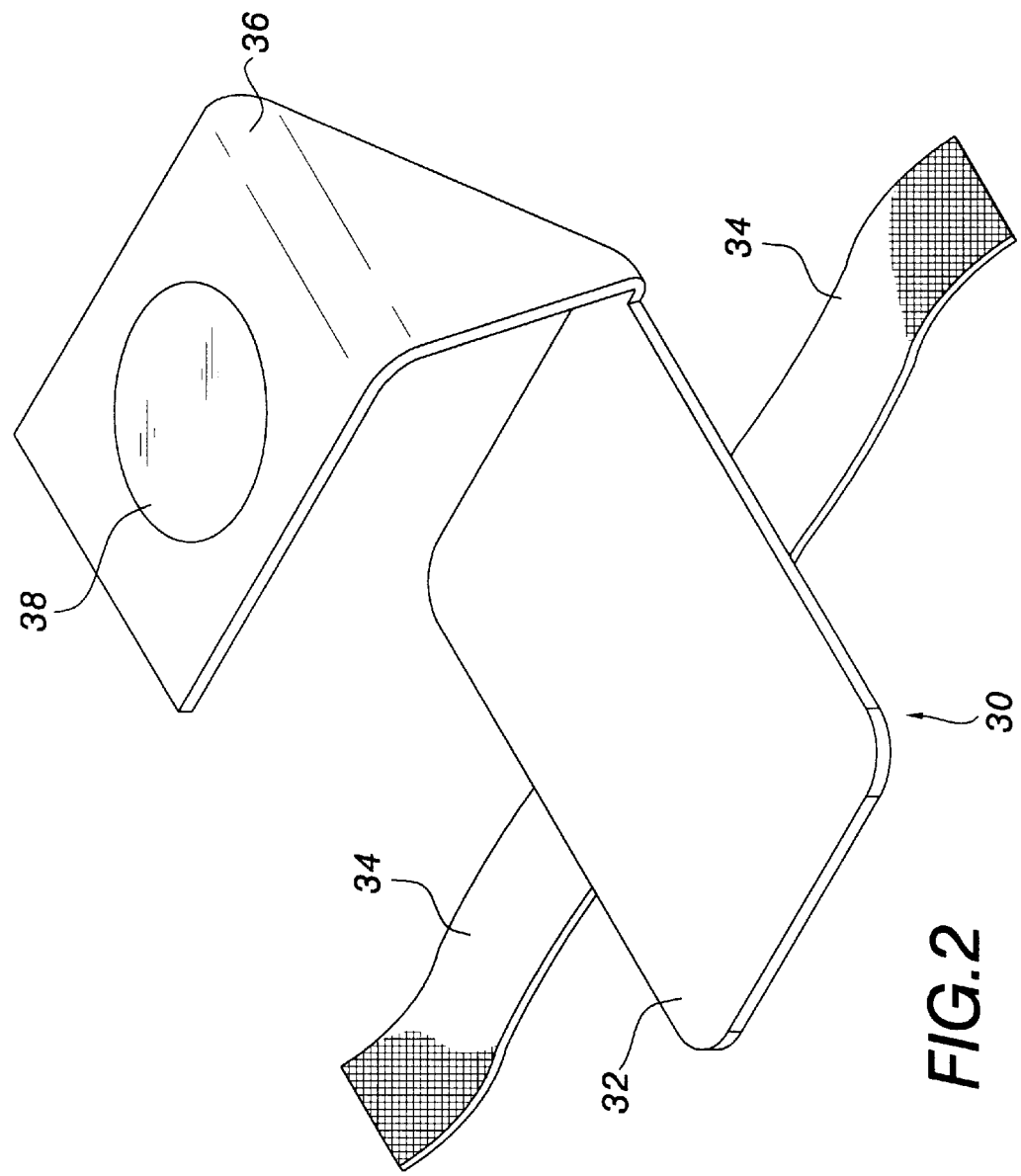
FIG. 2 is a perspective view of a magnifying device for simultaneously viewing all of the toes or toenails on one foot in accordance with a second embodiment of the present invention.

A toe and toenail magnifying device 30 in accordance with a second exemplary embodiment of the present invention is illustrated in FIG. 2. Device 30 includes a generally rectangular sheet-like main body portion 32 shaped to extend along the bottom of the foot. Like body portion 12, of the first embodiment, body portion 32 can comprise a rigid material, such as a polymer or metal or a semi-rigid, malleable or deformable material which can be bent to conform to the contour of a particular user's foot and which, once bent, tends to remain in the bent position in the absence of additional force.

Body portion 32 is secured to the bottom of the foot by fastening straps 34 which extend transversely from the longitudinal sides of body portion 32 and wrap around the sides and top of the user's foot. Straps 34 include a fastening mechanism adapted to secure the straps to each other or to body portion 32. Alternatively, a single strap that wraps around the foot and that is securable to itself or to body portion 32 can be used. The fastening mechanism can be any conventional fastening mechanism, including, but not limited to, those listed above with regard to straps 14 of the first embodiment. Preferably, strap or straps 34 are adjustable such that body portion 32 can be snugly attached to the user's foot.

Body portion 32 is connected on one longitudinal side to a sheet-like malleable support member 36. Support member 36 extends generally perpendicular from body portion 32, such that, when body portion 32 is in contact with the bottom of a foot positioned on the ground, support member 36 extends upward along the side of the foot. Optionally, the width of support member 36 increases from the proximal end attached to body portion 32 to the distal end (the unattached end of support member 36). Toward the distal end, a large hole is formed through support member 36 in which is situated a magnifying lens 38 that is fixedly attached to support member 36, such that support member 36 forms a peripheral housing around lens 20. Thus, at the distal end, support member 36 is sufficiently wide to surround magnifying lens 38. Support member 36 is malleable and has a sufficient length to allow the distal portion of support member 36 to be bent to extend over the top of the foot, such that all of the toes of the foot can be viewed through lens 38 simultaneously. That is, when properly positioned, magnifying lens 38 lies along a plane above the foot that is substantially parallel to the plane of body member 32 lying below the foot.

Like magnifying lens 20 of the first embodiment, magnifying lens 38 can be made of any transparent material having light-magnifying properties, and is shaped and sized to permit simultaneous viewing all of the user's toes and toenails from the user's vantage point.

In accordance with the second embodiment, body portion 32 and straps 34 can be used to coarsely position magnifying lens near the toes, and malleable support member 36 can be bent to finely position magnifying lens 38 in the desired position above the toes to center the toenails in the field of view of lens 38 and to select the desired magnification and working space between lens 38 and the toes.

Having described preferred embodiments of a new and improved magnifying device for viewing toes and toenails, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A magnifying device for viewing all five toenails of one foot, comprising:

a magnifying lens having dimensions sufficient to view all five toenails of one foot when positioned above the toes of a foot;

a longitudinally extending body portion shaped to extend along a lower portion of the leg with a distal longitudinal end adjacent the foot;

a strap mechanism coupled to said body portion and adapted to secure said body portion along the lower portion of the leg;

a head portion supporting said magnifying lens; and an attachment mechanism coupling said body portion to said head portion, such that a position of said head portion is adjustable relative to said body portion, thereby allowing a position of said magnifying lens to be adjusted relative to the toenails.

2. The magnifying device according to claim 1, wherein said body portion is curved in a transverse direction to follow a circumferential contour of a front portion of the lower portion of the leg, and wherein the distal longitudinal end of said body portion is curved to extend over an ankle and a portion of the foot.

3. The magnifying device according to claim 1, wherein said strap mechanism comprises first and second straps extending transversely from longitudinal sides of said body portion, said first and second straps being securable to each other or to said body portion.

4. The magnifying device according to claim 1, wherein said body portion is rigid.

5. The magnifying device according to claim 1, wherein said body portion is malleable, such that a position of said magnifying lens relative to the toenails is adjustable by deforming said body portion.

6. The magnifying device according to claim 1, wherein said magnifying lens is secured in a hole formed through said head portion, such that said head portion forms a peripheral housing around said magnifying lens.

7. The magnifying device according to claim 1, wherein said attachment mechanism comprises a tab that extends longitudinally from a center of a distal longitudinal edge of said body portion, said head portion having a cut-out portion adapted to receive said tab such that said tab is in slidable communication with said cut-out portion, whereby said head portion is extendable and retractable from the distal longitudinal edge of said body portion in a plane substantially parallel to a plane of the distal longitudinal end of said body portion.

8. The magnifying device according to claim 7, wherein said tab tapers toward its distal end.

9. The magnifying device according to claim 7, wherein said attachment mechanism maintains a position of said head portion relative to said body portion via frictional forces.

10. The magnifying device according to claim 7, wherein said attachment mechanism is indexed such that said head portion is held in one of a number of predetermined positions relative to said body portion.

11. The magnifying device according to claim 1, wherein said attachment mechanism slidably couples the distal longitudinal end of said body portion to a proximal end of said head portion, such that said head portion is extendable and retractable from the distal longitudinal end of said body portion in a direction substantially parallel to a longitudinal axis of the foot, thereby allowing a position of said magnifying lens to be adjusted relative to the toenails.

12. A magnifying device for viewing all five toenails of one foot, comprising:

a magnifying lens having dimensions sufficient to view all five toenails of one foot when positioned above the toes of a foot;

a generally flat, rectangular body portion configured to contact a bottom of the foot;

a strap mechanism coupled to said body portion and adapted to secure said body portion to the foot; and a malleable sheet-like support member supporting said magnifying lens and extending from one side of said body portion to a position above the foot, a position of said support member being adjustable via an application of force, whereby a position of said magnifying lens is adjustable relative to the toenails to enable simultaneously viewing of all five toes through said magnifying lens.

13. The magnifying device according to claim 12, wherein said strap mechanism comprises first and second straps extending transversely from longitudinal sides of said body portion, said first and second straps being securable to each other or to said body portion.

14. The magnifying device according to claim 12, wherein said body portion is rigid.

15. The magnifying device according to claim 12, wherein said body portion is malleable.

16. The magnifying device according to claim 12, wherein said magnifying lens is secured in a hole formed through said support member, such that said support member forms a peripheral housing around said magnifying lens.

17. A body-mounted magnifying device for viewing all five toenails of one foot, comprising:

a magnifying lens having dimensions sufficient to view all five toenails of one foot when positioned above the toes of a foot;

a body portion adapted to mount the magnifying device on a part of the body in proximity to the toes;

a strap mechanism coupled to said body portion and adapted to secure said body portion to the part of the body, thereby mounting the magnifying device on the part of the body;

a head portion supporting said magnifying lens; and an attachment mechanism coupling said body portion to said head portion, such that a position of said head portion is adjustable relative to said body portion, thereby allowing a position of said magnifying lens to be adjusted relative to the toenails.

18. The magnifying device according to claim 17, wherein said body portion is mounted on the body above the foot.

19. The magnifying device of claim 18, wherein said attachment mechanism permits said head portion to extend and retract from a distal end said body portion.

* * * * *